US006760741B1

(12) United States Patent
Vinitzky

(10) Patent No.: US 6,760,741 B1
(45) Date of Patent: Jul. 6, 2004

(54) FFT POINTER MECHANISM FOR FFT MEMORY MANAGEMENT

(75) Inventor: Gil Vinitzky, Azur (IL)

(73) Assignee: Corage Ltd., Herzlia (IL)

( * ) Notice: Subject to any disclaimer, the term of this patent is extended or adjusted under 35 U.S.C. 154(b) by 423 days.

(21) Appl. No.: 09/586,774

(22) Filed: Jun. 5, 2000

(51) Int. Cl.[7] .......................... G06F 15/00; G06F 17/14
(52) U.S. Cl. ....................... 708/403; 708/400; 708/404
(58) Field of Search ................................. 708/400–409; 711/211, 220; 375/240.11

(56) References Cited

U.S. PATENT DOCUMENTS

| | | | | |
|---|---|---|---|---|
| 3,617,720 A | * | 11/1971 | Gentleman | 708/404 |
| 3,662,161 A | * | 5/1972 | Bergland et al. | 708/404 |
| 3,673,399 A | * | 6/1972 | Hancke et al. | 708/404 |
| 3,704,826 A | * | 12/1972 | Constantin | 708/404 |
| 3,767,905 A | * | 10/1973 | Garde | 708/404 |
| 3,871,577 A | * | 3/1975 | Avellar et al. | 708/404 |
| 3,965,342 A | * | 6/1976 | Constant | 708/404 |
| 4,899,301 A | * | 2/1990 | Nishitani et al. | 708/404 |
| 5,091,875 A | * | 2/1992 | Wong et al. | 708/404 |
| 5,430,667 A | * | 7/1995 | Takano | 708/404 |
| 5,623,621 A | * | 4/1997 | Garde | 711/220 |
| 5,838,377 A | * | 11/1998 | Greene | 375/240.11 |
| 6,356,926 B1 | * | 3/2002 | Andre | 708/404 |
| 6,490,672 B1 | * | 12/2002 | Aizenberg et al. | 711/211 |

OTHER PUBLICATIONS

Leena et al., Hardware Implementation of FFT–8086 Based System, 1989, IEEE, p. 507–510.*
Johnson, Conflict Free Memory Addressing for Dedicated FFT Hardware, 1992, IEEE Transactions on Circuits and Systems–II: Analog and Digital Signal Processing vol. 39, No. 5, pp. 312–316.*
Gabor et al., High–Performance FFT Processing Using Reconfigurable Logic, 2001, IEEE, p. 1353–1356.*

Yingtao et al., Twiddle–Factor–Based FFT Algorithm with Reduced Memory Access, 2002, IEEE: Proceedings of the International Parallel and Distributed Processing Symposium, (total 8 pages).*
Yutai, An Effective Memory Addressing Scheme for FFT Processors, 1999, IEEE Transactions on Signal Processing, vol. 47, No. 3, p. 907–911.*
Danny, Simplified Control of FFT Hardware, Dec. 1976, IEEE Transactions on Acoustics, Speech, and Signal Processing, p. 577–579.*

* cited by examiner

*Primary Examiner*—Kakali Chaki
*Assistant Examiner*—Chat Do
(74) *Attorney, Agent, or Firm*—Eitan, Pearl, Latzer & Cohen Zedek, LLP

(57) ABSTRACT

A method for advancing pointers in a memory including a sequence of N data points of a stage M of a Fast Fourier Transform (FFT) whose first stage is stage 0, the N data points including N/2 a data points and N/2 B data points, the N data points are stored in the memory in $2^M$ groupings of a data points, each of the groupings having $2^{(Log_2 N)-1-M}$ data points, and each of the groupings is followed by a grouping of $2^{(Log_2 N)-1-M}$ B data points, the method including the steps of a) setting a pointer index $A_p$ equal to the binary value of the data point memory index corresponding to the first A data point in the memory, b) setting a pointer index $B_p$ equal to the binary value of the data point memory index corresponding to the first B data point in the memory, c) setting a first binary bit mask value R1 equal to $2^{(Log_2 N)-1-M}+1$, d) setting a second binary bit mask value R2 equal to $2^{(Log_2 N)-1-M}$, e) advancing the $B_p$ pointer index to the data point memory index corresponding to the next B data point in the memory by e1) adding the $A_p$ pointer index value to R1, e2) ORing the results of step e1) with R2, and e3) setting the B pointer index value equal to the results of step e2), and f) advancing the $A_p$ pointer index to the data point memory index corresponding to the next A data point in the memory by f1) adding the $A_p$ pointer index value to R1, f2) ANDing the results of step f1) with the bit-inverted value of R2, and f3) setting the $A_p$ pointer index value equal to the results of step f2).

6 Claims, 5 Drawing Sheets

| Memory Address | Data Point | Data Point Memory Index |
|---|---|---|
| FB902834 | 0 | 0000 |
| FB902836 | 1 | 0001 |
| FB902838 | 2 | 0010 |
| FB90283A | 3 | 0011 |
| FB90283C | 4 | 0100 |
| FB90283E | 5 | 0101 |
| FB902840 | 6 | 0110 |
| FB902842 | 7 | 0111 |
| FB902844 | 8 | 1000 |
| FB902846 | 9 | 1001 |
| FB902848 | 10 | 1010 |
| FB90284A | 11 | 1011 |
| FB90284C | 12 | 1100 |
| FB90284E | 13 | 1101 |
| FB902850 | 14 | 1110 |
| FB902852 | 15 | 1111 |

Fig. 3

| Memory Address | Data Point | Data Point Memory Index |
|---|---|---|
| FB902834 | 0 | 000 |
| FB902836 | 1 | 001 |
| FB902838 | 2 | 010 |
| FB90283A | 3 | 011 |
| FB90283C | 4 | 100 |
| FB90283E | 5 | 101 |
| FB902840 | 6 | 110 |
| FB902842 | 7 | 111 |

16

| Memory Address | Data Point | Data Point Memory Index |
|---|---|---|
| AC1252A0 | 8 | 000 |
| AC1252A2 | 9 | 001 |
| AC1252A4 | 10 | 010 |
| AC1252A6 | 11 | 011 |
| AC1252A8 | 12 | 100 |
| AC1252AA | 13 | 101 |
| AC1252AC | 14 | 110 |
| AC1252AE | 15 | 111 |

FFT POINTER MECHANISM FOR FFT MEMORY MANAGEMENT

FIELD OF THE INVENTION

The present invention relates to Digital Signal Processing (DSP) in general, and more particularly to methods and apparatus for improved "in-place" memory pointer management in support of Fast Fourier Transform (FFT) calculations.

BACKGROUND OF THE INVENTION

A Digital Signal Processor. (DSP) is a special-purpose computer that is designed to optimize digital signal processing tasks such as Fast Fourier Transformation (FFT), digital filtering, image processing, and speech recognition. DSP applications are typically characterized by real-time operation, high interrupt rates, and intensive numeric computations. In addition, DSP applications tend to be intensive in memory access operations and require the input and output of large quantities of data.

FFT data are made up of a sequence of N data points, where one data point comprises two data values, one real and one imaginary. The data points are grouped into N/2 "A" data points and N/2 "B" data points where each FFT butterfly operation as shown in FIG. 1 operates on one A data point $(A_R,A_I)$ and one B data point $(B_R,B_I)$ together with various coefficients $(W_R,W_I)$ to yield $(X_R,X_I)$ and $(Y_R,Y_I)$ which provide the A and B data points for the next stage of the FFT operation. The selection of data points as A and B data points for each FFT butterfly operation varies with each stage of the FFT.

The following table labeled Table 1—FFT (A,B) Groupings illustrates the (A,B) data point groupings required for each stage of an FFT having a sequence of 16 data points numbered 0 through 15.

TABLE 1

| FFT (A,B) GROUPINGS | | | |
|---|---|---|---|
| Stage 0 | Stage 1 | Stage 2 | Stage 3 |
| 0,8 | 0,4 | 0,2 | 0,1 |
| 1,9 | 1,5 | 1,3 | 2,3 |
| 2,10 | 2,6 | 4,6 | 4,5 |
| 3,11 | 3,7 | 5,7 | 6,7 |
| 4,12 | 8,12 | 8,10 | 8,9 |
| 5,13 | 9,13 | 9,11 | 10,11 |
| 6,14 | 10,14 | 12,14 | 12,13 |
| 7,15 | 11,15 | 13,15 | 14,15 |

The following table labeled Table 2—FFT A/B Dispositions illustrates the A/B disposition of each FFT data point at each stage of a 16-data point FFT:

TABLE 2

| FFT A/B DISPOSITIONS | | | | |
|---|---|---|---|---|
| Data Point | Stage 0 | Stage 1 | Stage 2 | Stage 3 |
| 0 | A | A | A | A |
| 1 | A | A | A | B |
| 2 | A | A | B | A |
| 3 | A | A | B | B |
| 4 | A | B | A | A |
| 5 | A | B | A | B |
| 6 | A | B | B | A |
| 7 | A | B | B | B |
| 8 | B | A | A | A |
| 9 | B | A | A | B |
| 10 | B | A | B | A |
| 11 | B | A | B | B |
| 12 | B | B | A | A |
| 13 | B | B | A | B |
| 14 | B | B | B | A |
| 15 | B | B | B | B |

In DSP architectures that perform FFT calculations data are read from and written to memory in several stages. Some DSP architectures employ separate memory spaces for input data and output data. In such a memory arrangement the results of one FFT stage may be written in the order of the A and B data point selection of the next stage, allowing for incremental advancing of pointers to the A and B data point memory addresses. The following table labeled Table 3—A/B Sort Order illustrates a theoretical FFT data point ordering that is pointer-optimized for each stage of a 16-data point FFT:

TABLE 3

| A/B SORT ORDER | | | | |
|---|---|---|---|---|
| A/B | Stage 0 | Stage 1 | Stage 2 | Stage 3 |
| A | 0 | 0 | 0 | 0 |
| A | 1 | 1 | 1 | 2 |
| A | 2 | 2 | 4 | 4 |
| A | 3 | 3 | 5 | 6 |
| A | 4 | 8 | 8 | 8 |
| A | 5 | 9 | 9 | 10 |
| A | 6 | 10 | 12 | 12 |
| A | 7 | 11 | 13 | 14 |
| B | 8 | 4 | 2 | 1 |
| B | 9 | 5 | 3 | 3 |
| B | 10 | 6 | 6 | 5 |
| B | 11 | 7 | 7 | 7 |
| B | 12 | 12 | 10 | 9 |
| B | 13 | 13 | 11 | 11 |
| B | 14 | 14 | 14 | 13 |
| B | 15 | 15 | 15 | 15 |

In order to reduce the amount of memory required for FFT, "in-place" memory management schemes have been developed whereby the FFT input data memory space is overwritten with the results of FFT calculations, thus eliminating the need for an additional memory space for storing the results at each stage of the FFT. Unfortunately, such a memory arrangement results in the data points being stored in memory in data point sort order as shown in Table 2 rather than in A/B sort order as shown in Table 3 for stages subsequent to stage 0, thus precluding incremental advancing of pointers to the A and B data point memory addresses. While memory address look-up tables or hard-coded memory addresses may be used, such approaches negate the memory efficiencies of "in-place" FFT.

SUMMARY OF THE INVENTION

The present invention seeks to provide methods and apparatus for improved "in-place" memory pointer management in support of Fast Fourier Transform (FFT) calculations.

There is thus provided in accordance with a preferred embodiment of the present. invention a method for advancing pointers in a memory including a sequence of N data points of a stage M of a Fast Fourier Transform (FFT) whose first stage is stage 0, the N data points including N/2 A data points and NV/2 B data points, the N data points are stored in the memory in $2^M$ groupings of A data points, each of the groupings having $2^{(Log_2N)-1-M}$ data points, and each of the groupings is followed by a grouping of $2^{(Log_2N)-1-M}$ B data points, the method including the steps of a) setting a pointer index $A_p$ equal to the binary value of the data point memory index corresponding to the first A data point in the memory, b) setting a pointer index $B_p$ equal to the binary value of the data point memory index corresponding to the first B data point in the memory, c) setting a first binary bit mask value R1 equal to $2^{(Log_2N)-1-M}+1$, d) setting a second binary bit mask value R2 equal to $2^{(Log_2N)-1-M}$, e) advancing the $B_p$ pointer index to the data point memory index corresponding to the next B data point in the memory by e1) adding the $A_p$ pointer index value to R1, e2) ORing the results of step e1) with R2, and e3) setting the $B_p$ pointer index value equal to the results of step e2), and f) advancing the $A_p$ pointer index to the data point memory index corresponding to the next A data point in the memory by f1) adding the $A_p$ pointer index value to R1, f2) ANDing the results of step f1) with the bit-inverted value of R2, and f3) setting the $A_p$ pointer index value equal to the results of step f2).

Further in accordance with a preferred embodiment of the present invention the method further includes repeating steps e) and f) more than one time.

Still further in accordance with a preferred embodiment of the present invention the method further includes repeating steps e) and f) until the $A_p$ pointer index equals the data point memory index corresponding to the last of the A data points in the memory and the $B_p$ pointer index equals the data point memory index corresponding to the last of the B data points in the memory.

It is appreciated throughout the specification and claims that the term "data point" refers to a pairing of two data values, a real value and an imaginary value.

It is also appreciated throughout the specification and claims that the term "data point memory index" refers to the minimum number of addressing bits needed to uniquely identify one data point from another within a single memory space.

BRIEF DESCRIPTION OF THE DRAWINGS

The present invention will be understood and appreciated more fully from the following detailed description taken in conjunction with the appended drawings in which:

FIG. 3, is a simplified tabular illustration of FFT input data memory, constructed and operative in accordance with a preferred embodiment of the present invention;

FIG. 5 is a simplified tabular illustration of FFT input data memory where two separate memory spaces are used, constructed and operative in accordance with, another preferred embodiment of the present invention.

DETAILED DESCRIPTION OF TIE PRESENT INVENTION

Figure 1:
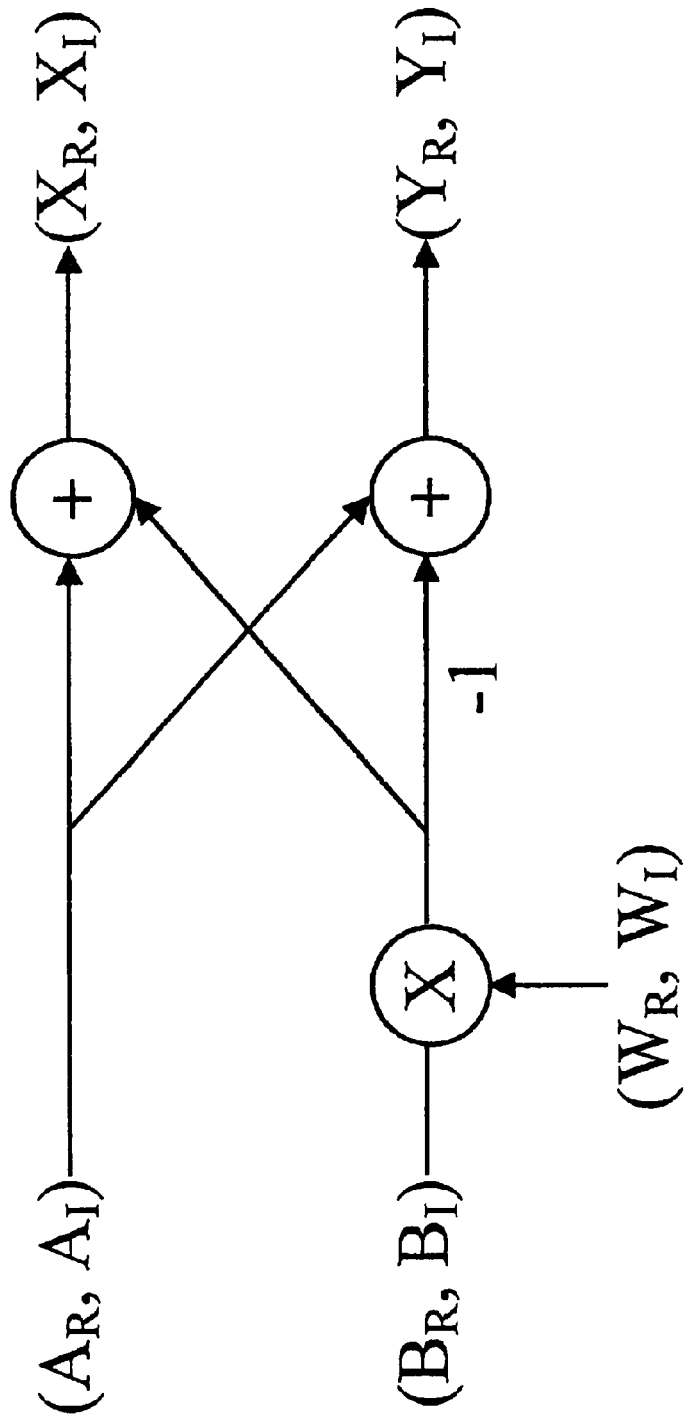
FIG. 1 is a simplified graphical illustration of a Fast Fourier Transform (FFT) butterfly operation.
Figure 2:
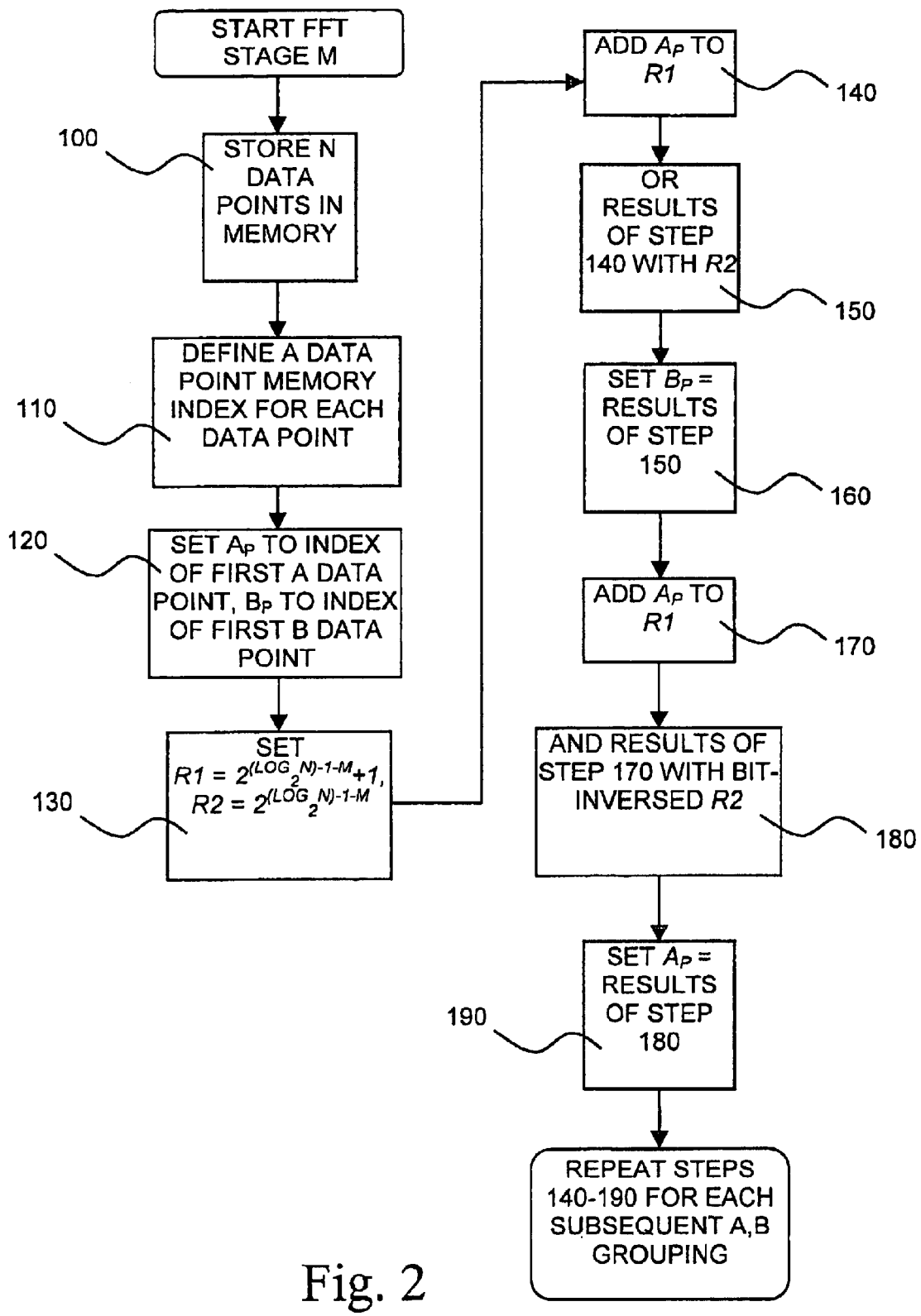
FIG. 2 is a simplified flowchart illustration of a method for improved in-place memory pointer management for FFT calculations, operative in accordance with a preferred embodiment of the present invention.

Reference is now made to FIG. 2 which is a simplified flowchart illustration of a method for improved in-place memory pointer management for Fast Fourier Transform (FFT) calculations, operative in accordance with a preferred embodiment of the present invention, and FIG. 3, which is a simplified tabular illustration useful in understanding the method of FIG. 2, constructed and operative in accordance with a preferred embodiment of the present invention. In the method of FIG. 2 a sequence of N data points numbered from 0 to N−1 is stored in a memory of a Digital Signal Processor (step 100), The arrangement of data points within a memory may be seen with particular reference to FIG. 3. In FIG. 3 a logical representation of a memory 10 is shown storing 16 FFT data points numbered 0–15. Although 16 data points are shown, it is appreciated that memory 10 may be used to store any number of data points N.

A data point memory index 12 may be defined for each data point as the minimum number of addressing bits needed to uniquely identify one data point from another within a single memory space (step 110). Thus, where an FFT comprises 16 data points stored contiguously in a single memory, four bits are required. Since each data point comprises both a real and an imaginary data value typically stored at two contiguous memory addresses, the starting address of any data point may be determined by multiplying the data point memory index corresponding to the data point by 2 and adding the product to a base memory address 14 at which FFT data point storage begins. Thus, for example, in FIG. 3, the starting memory address of data point 5 whose data point memory index is 0101 may be derived by adding 1010 to the base memory address of FB902834, giving FB902834+0A=FB90283B.

As is shown in Table 2 above, a particular feature of in-place FFT memory management is that for any sequence of N data points of any stage M of the FFT whose first stage is stage 0, the N/2 A data points and N/2 B data points comprising the N data points are avenged in memory such that the A data points are stored in said memory in $2^M$ groupings, where each grouping has $2^{(Log_2N)-1-M}$ data points, and where each grouping is followed by a grouping of $2^{(Log_2N)-1-M}$ B data points. Thus, for example, in stage 2 of a 16-data point FFT there are 4 A data point groupings ($2^M$) of 2 data points each ($2^{(Log_2N)-1-M}$), where each A data point grouping is followed by a B data point grouping of 2 data points each.

The method of FIG. 2 continues with the initialization of pointers and bit masks at the beginning of an FFT stage. A pointer index $A_p$ is set to a value equal to the binary value of the data point memory index corresponding to the first A data point in memory 10. A pointer index $B_p$ is likewise set to a value equal to the binary value of the data point memory index corresponding to the first B data point in memory 10 (step 120). A binary bit mask value R1 is set equal to $2^{(Log_2N)-1-M}+1$, and a binary bit mask value R2 is set equal to $2^{(Log_2N)-1-M}$ (step 130). Bit masks R1 and R2 preferably have the same number of bits as the data point memory index. The first data point grouping (A,B) of stage M may be determined by adding pointer indices $A_p$ and $B_p$ respectively to the memory address of data point 0 in memory 10.

Pointer index $B_p$ may be advanced to the data point memory index corresponding to the next B data point in memory 10 as follows:

1a) add the $A_p$ pointer index value to R1 (step 140);

2a) OR the results of step 1a) with R2 (step 150); and 3a) set the $B_p$ pointer index value equal to the results of step 2a) (step 160).

Pointer index $A_p$ may be advanced to the data point memory index corresponding to the next A data point in memory 10 as follows:

1b) add the $A_p$ pointer index value to R1 (step 170);

2b) AND the results of step 1b) with the bit-inverted value of R2 (step 180); and 3b) set the $A_p$ pointer index value equal to the results of step 2b) (step 190).

Pointer indices $A_p$ and $B_p$ are then advanced to the data point memory index of each subsequent A and B data point respectively in memory 10.

Figure 4:
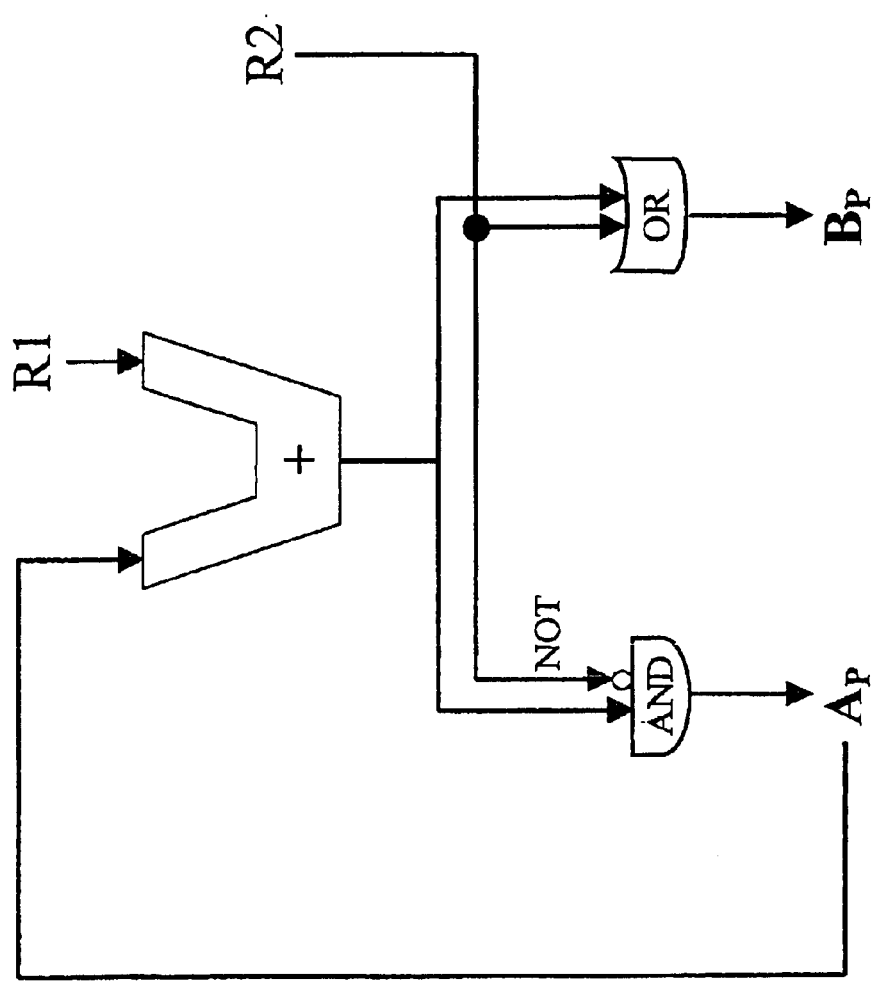
FIG. 4 is a simplified logic diagram useful in understanding the method of FIG. 2, constructed and operative in accordance with a preferred embodiment of the present invention.

The logic operations described hereinabove with reference to FIG. 2 may be seen with particular reference to FIG. 4 which is a simplified logic diagram useful in understanding the method of FIG. 2, constructed and operative in accordance with a preferred embodiment of the present invention.

Typical operation of the method of FIG. 2 is now illustrated by way of example as follows. Referring to Table 1 above, the first (A,B) data point grouping in FFT stage 2 comprises data points 0 and 2. Pointer index $A_p$ is thus set to data point memory index 0000, while pointer index $B_p$ is set to 0010, in accordance to the data point memory index values shown for data points 0 and 2 in FIG. 3. A binary bit mask value R1 is set equal to $2^{(Log_2 N)-1-M}+1$ ($=2^{4-1-2}+1=2^1+1=0011$), and a binary bit mask value R2 is set equal to $2^{(Log_2 N)-1-M}$ (=0010).

The next (A,B) data point grouping in FFT stage 2 comprises data points 1 and 3 having a data point memory index of 0001 and 0011 respectively as shown in FIG. 3. Pointer index $B_p$ is advanced from 0010 to 0011 as follows:

1a) add the $A_p$ pointer index value to R1 (=0000+0011= 0011);

2a) OR the results of step 1a) with R2 (=0011 OR 0010=0011); and 3a) set the $B_p$ pointer index value equal to the results of step 2a) (=0011).

Pointer index $A_p$ is advanced from 0000 to 0001 as follows:

1b) add the $A_p$ pointer index value to R1 (=0000+0011= 0011);

2b) AND the results of step 1b) with the bit-inverted value of R2 (=0011 AND 1101=0001); and 3b) set the $A_p$ pointer index value equal to the results of step 2b) (=0001).

The next (A,B) data point grouping in FFT stage 2 comprises data points 4 and 6 having a data point memory index of 0100 and 0110 respectively as shown in FIG. 3. Pointer index $B_p$ is advanced from 0011 to 0110 as follows:

1a) add the $A_p$ pointer index value to R1 (=0001+0011= 0100);

2a) OR the results of step 1a) with R2 (=0100 OR 0010=0110); and 3a) set the $B_p$ pointer index value equal to the results of step 2a) (=0110).

Pointer index $A_p$ is advanced from 0001 to 0100 as follows:

1b) add the $A_p$ pointer index value to R1 (=0001+0011= 0100);

2b) AND the results of step 1b) with the bit-inverted value of R2 (=0100 AND 1101=0100) and 3b) set the $A_p$ pointer index value equal to the results of step 2b). (=0100).

Thus, the method of FIG. 2 may be used to advance pointer indices $A_p$ and $B_p$ to the data point memory index of each A and B data point respectively in memory 10 in a manner that is particularly adapted to the locations of A and B data points at each stage of the FFT as shown above in Table 2.

Reference is now made to FIG. 5 which is a simplified tabular illustration of FFT input data memory where two separate memory spaces are used, constructed and operative in accordance with another preferred embodiment of the present invention. In FIG. 5 logical representations of a first memory space 16 and a second memory space 18 are shown storing 16 FFT data points numbered 0–15. Although 16 data points are shown, it is appreciated that memories 16 and 18 may be used to collectively store any number of data points N. Since two separate memory spaces are used to store 8 data points each, a data point memory index 20 of only three bits is required to uniquely identify one data point from another within each memory space. The method of FIG. 2 may be used with only slight modification as adding pointer indices $A_p$ and $B_p$ respectively to the memory addresses of the first data points in both memories 16 and 18 will allow for two data point groupings (A,B) to be determined for any given value of pointer indices $A_p$ and $B_p$. Thus, referring to Table 1 above, the data point groupings (0,2) and (8,10) in FFT stage 2 may both be determined with a pointer index $A_p$=000 and a pointer index $B_p$=010, in accordance to the data point memory index values shown for data points 0, 2, 8, and 10 in FIG. 5.

The methods and apparatus disclosed herein have been described without reference to specific hardware or software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments show. It is appreciated that various modifications may occur to those skilled in the art that, while not specifically shown herein, are nevertheless within the true spirit and scope of the invention.

What is claimed is:

1. A method for advancing pointers in a memory comprising a sequence of N data points of a stage M of a Fast Fourier Transform (FFT) whose first stage is stage 0, the N data points comprising N/2 A data points and N/2 B data points, wherein said N data points are stored in said memory in $2^M$ groupings of A data points, each of said groupings having $2^{(Log_2 N)-1-M}$ data points, and wherein each of said groupings is followed by a grouping of $2^{(Log_2 N)-1-M}$ B data points, the method comprising the steps of:

a) setting a pointer index $A_p$ equal to a binary value of a data point memory index corresponding to a first of said A data points in said memory;

b) setting a pointer index $B_p$ equal to a binary value of a data point memory index corresponding to a first of said B data points in said memory;

c) setting a first binary bit mask value R1 equal to $2^{(Log_2 N)-1-M}+1$;

d) setting a second binary bit mask value R2 equal to $2^{(Log_2 N)-1-M}$;

e) advancing said $B_p$ pointer index to the data point memory index corresponding to the next B data point in said memory by:
   e1) adding said $A_p$ pointer index value to R1;
   e2) ORing results of step e1) with R2; and
   e3) setting said $B_p$ pointer index value equal to results of step e2); and
f) advancing said $A_p$ pointer index to the data point memory index corresponding to the next A data point in said memory by:
   f1) ANDing results of step e1) with the bit-inverted value of R2; and
   f2) setting said $A_p$ pointer index value equal to results of step f1).

2. A method according to claim 1 and further comprising repeating steps e) and f) more than one time.

3. A method according to claim 1 and further comprising repeating steps e) and f) until said $A_p$ pointer index equals the data point memory index corresponding to the last of said A data points in said memory and said $B_p$ pointer index equals the data point memory index corresponding to the last of said B data points in said memory.

4. A method comprising:
   using dynamically calculated addresses to access successive pairs of input data points of a current stage of a Fast Fourier Transform calculation stored contiguously in one or more memories so as to overwrite input data points of a previous stage of said Fast Fourier Transform calculation; and
   calculating said addresses by:
      setting a first pointer index value to a first of a pair of input data points for said current stage:
      setting a second pointer index value to a second of said pair,
      advancing said first pointer index value to a first of a next pair of input data points for said current stag; and
      advancing said second pointer index value to a second of said next pair,
   wherein advancing said first pointer index value and advancing said second pointer index value comprise:
      adding said first binary pointer index value to a first binary stage-dependent value to produce a sum;
      setting said second binary point index value to the result of a logical OR operation on said sum and a second binary stage-dependent value; and
      setting said first binary pointer index value to the result of a logical AND operation on said sum and a bit-inverted version of said second binary stage-dependent value.

5. A method comprising:
   dynamically calculating for successive pairs of input data points of a current stage of a Fast Fourier Transform calculation a first pointer index value and a second pointer index value, said input data points stored in a memory in data point sort order so as to overwrite input data points of a previous stage of said Fast Fourier Transform calculation;
   adding said first pointer index value to a base memory address to address a first input data point of a particular pair; and
   adding said second pointer index value to said base memory address to address a second input data point of said particular pair,
wherein said base memory address is an address of a first input data point for a first pair of said current stage, and
wherein dynamically calculating said first pointer index value and said second pointer index value comprises:
   adding said first binary pointer index value to a first binary stage-dependent value to produce a sum;
   setting said second binary point index value to the result of a logical OR operation on said sum and a second binary stage-dependent value; and
   setting said first binary pointer index value to the result of a logical AND operation on said sum and a bit-inverted version of said second binary stage-dependent value.

6. A digital signal processor comprising:
   a memory to store contiguously input data points of a stage of a Fast Fourier Transform calculation, said input data points to be accessed by binary pointer indices, and said input data points to be stored in the same place that input data points of other stages of said Fast Fourier Transform calculation are to be stored;
   an arithmetic logic unit to add a current value of a first binary pointer index to a first binary stage-dependent value to produce a sum;
   a logical OR gate to perform a logical OR operation on said sum and a second binary stage-dependent value to produce a next value of a second binary pointer index; and
   a logical AND gate to perform a logical AND operation on said sum and a bit-inverted version of said second binary stage-dependent value to produce a next value of said first binary pointer index.

* * * * *